(12) United States Patent
Sorger et al.

(10) Patent No.: US 10,239,789 B2
(45) Date of Patent: Mar. 26, 2019

(54) FIBER-CONTAINING CONCRETE COMPOSITIONS

(75) Inventors: Klas Sorger, München (DE); Jürgen Bezler, Burghausen (DE); Klaus Bonin, Burghausen (DE)

(73) Assignee: Wacker Chemie AG, Munich (DE)

( * ) Notice: Subject to any disclaimer, the term of this patent is extended or adjusted under 35 U.S.C. 154(b) by 273 days.

(21) Appl. No.: 13/144,043

(22) PCT Filed: Jan. 8, 2010

(86) PCT No.: PCT/EP2010/050114
§ 371 (c)(1),
(2), (4) Date: Jul. 11, 2011

(87) PCT Pub. No.: WO2010/079199
PCT Pub. Date: Jul. 15, 2010

(65) Prior Publication Data
US 2011/0268953 A1 Nov. 3, 2011

(30) Foreign Application Priority Data
Jan. 12, 2009 (DE) .................. 10 2009 000 142

(51) Int. Cl.
| | | |
|---|---|---|
| *B32B 7/02* | (2006.01) | |
| *C04B 28/02* | (2006.01) | |
| *C04B 24/26* | (2006.01) | |
| *C04B 103/00* | (2006.01) | |
| *C04B 111/00* | (2006.01) | |

(52) U.S. Cl.
CPC .......... *C04B 28/02* (2013.01); *C04B 24/2623* (2013.01); *C04B 2103/0065* (2013.01); *C04B 2111/0075* (2013.01); *C04B 2111/00146* (2013.01); *Y02W 30/97* (2015.05)

(58) Field of Classification Search
CPC .... B32B 7/02; C04B 7/02; C04B 7/24; C04B 7/26; C04B 28/02; C08L 67/00
USPC .............................. 428/212, 220; 524/5, 513
See application file for complete search history.

(56) References Cited

U.S. PATENT DOCUMENTS

| | | | |
|---|---|---|---|
| 4,340,510 A | | 7/1982 | Howanietz |
| 4,434,257 A | * | 2/1984 | Narisawa et al. ................ 524/5 |
| 6,166,113 A | * | 12/2000 | Haerzschel et al. ............. 524/5 |
| 6,262,167 B1 | * | 7/2001 | Weitzel et al. ............... 524/513 |
| 2009/0030168 A1 | | 1/2009 | Schorm |

FOREIGN PATENT DOCUMENTS

| | | |
|---|---|---|
| DE | 1941223 | 2/1971 |
| DE | 2856764 | 7/1979 |
| DE | 3110658 | 10/1982 |
| DE | 19620817 | 11/1997 |
| DE | 102006007282 | 8/2007 |
| EA | 2007106934 | 9/2001 |
| EP | 0032421 | 7/1981 |
| EP | 0347092 | 12/1989 |
| EP | 0431600 | 6/1991 |
| EP | 0769482 | 4/1997 |

OTHER PUBLICATIONS

Fox, T. G., Bull. Am. Physics Soc., 1, 3, p. 123 (1956).
Polymer Handbook 2nd Edition, J. Wiley & Sons, New York (1975).
International Search Report for PCT/EP2010/050114 filed Jan. 8, 2010, dated May 11, 2010.

* cited by examiner

*Primary Examiner* — Lawrence D Ferguson
(74) *Attorney, Agent, or Firm* — RatnerPrestia

(57) ABSTRACT

The invention relates to fiber-containing concrete compositions containing hydraulically setting binders, fillers, one or more fibers, and possibly other additives or admixtures, characterized in that one or more vinylester-ethylene copolymers are contained as additional components.

13 Claims, No Drawings

FIBER-CONTAINING CONCRETE COMPOSITIONS

CROSS REFERENCE TO RELATED APPLICATIONS

This application is the national phase filing of international patent application No. PCT/EP2010/050114, filed 8 Jan. 2010, and claims priority of German patent application number 10 2009 000 142.5, filed 12 Jan. 2009, the entireties of which applications are incorporated herein by reference.

FIELD OF THE INVENTION

The invention relates to fiber-containing concrete compositions and the use thereof in construction engineering, such as for example in the field of mining or tunneling, or for the production of industrial floors or finished concrete parts.

BACKGROUND OF THE INVENTION

Concrete compositions contain hydraulically setting binders such as cement, fillers, such as sand or gravel and if necessary other additives. By addition of water, the concrete compositions are mixed and converted into fresh concrete, which can then be used by the known methods in construction engineering. Setting of the fresh concrete leads to solid concrete. Depending on the field of use, the solid concrete must possess a particular property profile. Thus for the production of rolling shafts in mining, industrial floors or for slope stabilization, tunnel lining and stabilization, especially high requirements are set for the abrasion resistance or the stability under impact stress of solid concrete. In order to fulfill such requirements, fiber-containing concrete is for example recommended in EP-A 32421. Suitable fibers are for example steel, glass or polyethylene fibers. Concrete reinforced with steel wire is described in DE-A 1941223.

However, through the use of fibers alone the stability of concrete required in many applications cannot be attained, even if the content of fibers is increased. For with increasing content of fibers the workability of the fresh concrete, such as its pumpability, decreases or there is an inhomogeneous distribution of the fibers in the fresh concrete, so-called "balling", which adversely affects the properties of the solid concrete.

In DE-A 2856764, concrete mixtures based on hydraulically setting binders, additives such as polymers with low temperature tack, plastic fibers and molded plastic shapes are disclosed. As polymers, homopolymers are essentially used. The polymers of DE-A 2856764 have a low temperature tack with $T_{max}$ values of less than $-8°$ C. (measured as per DIN 53445), which corresponds to a glass transition temperature Tg of $<-15°$ C. (measured by dynamic differential calorimetry, DSC). To achieve these $T_{max}$ values, polymers of short chain length were used or plasticizers were added. Finally, such polymers as a component of concrete compositions lead to solid concrete which is still unsatisfactory as regards internal cohesion and strength. In addition, external plasticizers can easily become extracted from the concrete matrix in the course of time. Overall, owing to these fundamental features of DE-A 2856764, the property profile of corresponding solid concretes is limited, for example their resistance to abrasion or erosion, particularly with intensive long-term stress.

Against this background, the problem was to provide fiber-containing concrete compositions which finally lead to solid concrete which does not have the aforesaid disadvantages, in particular the solid concrete should also resist severe stresses such as abrasion or impact stress.

SUMMARY OF THE INVENTION

Surprisingly, this problem was solved with fiber-containing concrete compositions which in addition contained vinyl ester-ethylene copolymers.

DETAILED DESCRIPTION OF THE INVENTION

The invention provides fiber-containing concrete compositions containing hydraulically setting binders, fillers, one or more fibers and if necessary further additives or aggregates, characterized in that one or more vinyl ester-ethylene copolymers are contained as an additional component.

The vinyl ester-ethylene copolymers are obtainable by radical-initiated polymerization of
a) one or more vinyl esters and
b) ethylene and if appropriate
c) one or more other ethylenically unsaturated comonomers.

The vinyl ester-ethylene copolymers preferably have glass transition temperatures Tg from $-15$ to $20°$ C., particularly preferably from $-10$ to $5°$ C. and most preferably from $-10$ to $0°$ C. The glass transition temperature can inter alia be adjusted via the ethylene content of the vinyl ester-ethylene copolymers. A higher ethylene content results in a lower glass transition temperature. Vinyl ester-ethylene copolymers with such glass transition temperatures are advantageous for the production of solid concrete with particularly high resistance to abrasion and impact stress and thus low wear.

Ethylene b) is preferably used for the production of the vinyl ester-ethylene copolymers at 5 to 35 wt %, particularly preferably at 8 to 30 wt % and most preferably at 15 to 25 wt %, each based on the total weight of the monomers used overall for the production of the vinyl ester-ethylene copolymers.

Vinyl esters a) suitable for the vinyl ester-ethylene copolymers are for example vinyl esters of carboxylic acids with 1 to 15 C atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids with 5 to 13 C atoms, for example VeoVa9R or VeoVa10R (Shell trade names). Vinyl acetate is particularly preferred.

Vinyl esters a) are preferably used for the production of the vinyl ester-ethylene copolymers at 50 to 95 wt %, particularly preferably at 60 to 90 wt % and most preferably at 65 to 85 wt %, each based on the total weight of the monomers used overall for the production of the vinyl ester-ethylene copolymers.

As comonomers c), one or more monomers can be selected from the group comprising methacrylate esters or acrylate esters with unbranched or branched alcohols with 1 to 15 C atoms, ethylenically unsaturated silanes, vinyl aromatics, vinyl halides, dienes and olefins different from ethylene.

Preferred methacrylate esters or acrylate esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate and hydroxyethyl acrylate. Particularly preferred are methyl acrylate, methyl methacrylate, n-butyl acrylate, hydroxyethyl acrylate and 2-ethylhexyl acrylate.

Preferred dienes or olefins different from ethylene are propylene and 1,3-butadiene. Preferred vinyl aromatics are styrene and vinyltoluene. A preferred vinyl halide is vinyl chloride.

The comonomers c) are preferably used for the production of the vinyl ester-ethylene copolymers at 0 to 45 wt %, particularly preferably at 0 to 25 wt %, each based on the total weight of the monomers used overall for the production of the vinyl ester-ethylene copolymers.

If necessary, 0.05 to 5 wt %, preferably 1 to 2 wt %, based on the total weight of the vinyl ester-ethylene copolymers, of auxiliary monomers can also be copolymerized. Examples of auxiliary monomers are ethylenically unsaturated carboxylic acids, preferably acrylic acid, methacrylic acid, crotonic acid, itaconic acid or fumaric acid, maleic acid, ethylenically unsaturated carboxylic acid nitriles, preferably acrylonitrile; mono and diesters of fumaric acid and maleic acid such as the diethyl and diisopropyl esters, and maleic anhydride, ethylenically unsaturated sulfonic acids or salts thereof, preferably vinylsulfonic acid or 2-acrylamido-2-methylpropanesulfonic acid.

Examples of preferred copolymers are copolymers of one or more vinyl esters with ethylene, copolymers of one or more vinyl esters with ethylene and one or more methacrylate esters or acrylate esters, copolymers of one or more vinyl esters with ethylene and one or more further ethylenically unsaturated carboxylic acids and copolymers of one or more vinyl esters with ethylene and vinyl chloride.

Particularly preferred are copolymers of vinyl acetate with 8 to 25 wt % ethylene, copolymers of vinyl acetate with 5 to 25 wt % ethylene and 1 to 50 wt % of one or more further vinyl esters different from vinyl acetate; copolymers of vinyl acetate with 5 to 25 wt % ethylene and 1 to 45 wt % of one or more methacrylate esters or acrylate esters; copolymers of vinyl acetate with 5 to 25 wt % ethylene and 1 to 25 wt % of one or more further vinyl esters different from vinyl acetate and 1 to 45 wt % of one or more methacrylate esters or acrylate esters; copolymers of vinyl acetate with 1 to 25 wt % ethylene and 1 to 50 wt % of one or more ethylenically unsaturated carboxylic acids; where the copolymers can each also contain said auxiliary monomers in said quantities, and the statements in wt % add up to 100 wt % in each case.

Through the choice of monomer and through the choice of the proportions by weight of the comonomers, there result vinyl ester-ethylene copolymers with the desired glass transition temperature Tg. The glass transition temperature Tg of the copolymers can be determined in a known manner by differential scanning calorimetry (DSC). The Tg can also be approximately calculated in advance by means of the Fox equation. According to Fox T. G., Bull. Am. Physics Soc. 1, 3, page 123 (1956): $1/T_g = x_1/T_{g1} + x_2/T_{g2} + \ldots + x_n/T_{gn}$, where $x_n$ stands for the mass fraction (wt %/100) of the monomer n, and $T_{gn}$ is the glass transition temperature in kelvins of the homopolymer of the monomer n. Tg values for homopolymers are listed in Polymer Handbook $2^{nd}$ Edition, J. Wiley & Sons, New York (1975).

The production of the copolymers is effected in an aqueous medium and preferably by the emulsion or suspension polymerization process, as for example described in DE-A 102006007282. Here the polymers are formed in the form of aqueous dispersions. During the polymerization, the usual protective colloids and/or emulsifiers can be used, as described in DE-A 102006007282. With the use of emulsifiers, preferably no anionic emulsifiers are used, since these can in isolated cases lead to coagulation. Preferably used as protective colloids are partly saponified or fully saponified polyvinyl alcohols with a hydrolysis level of 80 to 100 mol %, in particular partly saponified polyvinyl alcohols with a hydrolysis level of 80 to 94 mol % and a Höppler viscosity, in 4% aqueous solution, of 1 to 30 mPas (method according to Höppler at 20° C., DIN 53015). Said protective colloids are accessible by processes well known to those skilled in the art and are generally added during the polymerization in a quantity of 1 to 20 wt % overall, based on the total weight of the monomer.

The polymers in the form of aqueous dispersions can be converted by common drying processes into corresponding powders redispersible in water. For this, as a rule a drying aid in a total quantity of 3 to 30 wt %, preferably 5 to 20 wt %, based on the polymeric components of the dispersion, is used. The aforesaid polyvinyl alcohols are preferred as drying aids.

As fibers, for example natural, modified natural or artificial fibers are suitable. Preferred fibers are steel fibers, glass fibers, carbon fibers or fibers of polypropylene, polyethylene, polyvinyl alcohol, polyacrylonitrile, polyester, polyamide or also cellulose fibers or modified cellulose fibers. Particularly preferred are steel fibers, polyvinyl alcohol or polypropylene fibers. Most preferred are steel fibers. Mixtures of several fibers can also be used. The fibers can be used in the form of loose fibers, fibers glued into bundles, fibrillated fibers, multifilament fibers or fibers in dispensing packaging.

As steel fibers, the common sheet iron, wire, machining or preferably cold-drawn steel wire fibers can be used. The material of the steel fibers is usually construction steel, stainless steel or galvanized steel. The steel fibers can have a smooth or profiled surface and if necessary be provided with end hooks and with additional embossing. Milled steel fibers with a sickle-shaped cross-section, twisted on the longitudinal axis, wire fibers, bent and cut or punched, and sheet metal fibers, if necessary provided with embossments to improve the bonding, can be used. The steel fibers can replace structural reinforcement. The fibers usually have a length of 5 to 100 mm, in particular from 10 to 60 mm.

Common hydraulic binders are cement, in particular Portland cement, aluminate cement, pozzolanic cement, slag cement, magnesia cement, phosphate cement or blast furnace slag cement; and mixed cements (composite cements).

Typical formulae for the fiber-containing concrete compositions contain 9 to 40 wt %, in particular 12 to 25 wt % of cement, preferably Portland cement CEM I, Portland slag cement CEM II/A-S or CEM II/B-S or blast furnace slag cement CEM III/A or CEM III/B. Vinyl ester-ethylene copolymers are used at 0.1 to 5.0 wt %, preferably at 0.2 to 2.0 wt %, particularly preferably from 0.4 to 1.5 wt %, each preferably in the form of an aqueous dispersion with a solids content from 10 to 75 wt %, particularly preferably from 40 to 60 wt %. Fibers are contained at 0.01 to 15 wt %, particularly preferably at 0.1 to 5 wt %, 0.5 to 5 wt % being contained most preferably in the case of steel fibers, and 0.05 to 2 wt % most preferably in the case of plastic fibers. A further component is 50 to 90 wt %, preferably 65 to 90 wt % of fillers such as sand, gravel or chippings. Unless otherwise stated, the statements in wt % are each based on 100 wt % dry mass of the formula. In addition, for the production of the aqueous fiber-containing concrete compositions, 20 to 90 wt %, particularly preferably 30 to 80 wt % and most preferably 40 to 65 wt % of water, based on the total mass of the cement used, are normally used.

If the fiber-containing concrete compositions are processed by the common wet or dry spray processes, then setting accelerators are normally used as an additive at 3 to 10 wt %, based on the cement content of the concrete composition. Examples of setting accelerators are aluminum compounds, silicates and alkali metal hydroxides or carbonates. Preferred setting accelerators are aluminum salts, aluminates, alkali metal silicates, such as for example waterglass, alkali metal carbonates or potassium hydroxide.

The use properties of the fiber-containing concrete compositions can be improved through further additives. Additives contained in preferred embodiments are for example 0.2 to 2 wt %, preferably 0.2 to 1.5 wt % and particularly preferably 0.4 to 1.0 wt %, based on cement, of concrete liquefiers (also known to those skilled in the art as flow agents), or pigments, foam stabilizers, hydrophobization agents, plasticizers, fly ash, dispersed silicic acid, air-entraining agents to control the concrete bulk density or pumping aids to improve the pumpability. Furthermore, if necessary, additives can be added to the fiber-containing concrete compositions which modulate the setting-accelerating effect of the setting accelerator on the wet concrete mixtures, such as for example phosphoric acid, phosphonic acids, polyphosphate, polyhydroxycarboxylic acids or organic additives, in particular polyacrylic acid, hexamethylene tetramine, alkanolamines such as for example diethanolamine (DEA) or triethanolamine.

The production of the fiber-containing concrete compositions from the individual components of the formula is not tied to any particular procedure or mixing device. The individual components can be used during the mixing in dry form or if necessary in aqueous form. The mixing can for example take place in a concrete mixer or in a finished concrete mixing device. The fiber-containing concrete compositions can be in the form of dry or aqueous mixtures.

The fiber-containing concrete compositions can be applied by the common methods for the processing of concrete mixtures, such as for example the wet spray concrete, dry spray concrete or manual methods. In the use of the spray concrete process, the known devices such as for example spray robots or spraying machines can be used.

The layer thickness of the solid concrete is preferably ≥5 cm, particularly preferably ≥15 cm.

With the fiber-containing concrete compositions according to the invention, both solid concrete and also fresh concrete with particularly advantageous properties are obtained.

Thus for example, compared to conventional solid concrete, solid concrete modified according to the invention has improved bending tensile strength which manifests itself in higher ductility of the solid concrete and leads to increased resistance to impact stress, abrasion and wear and guards against brittle fracture failure. Surprisingly, in spite of the ethylene component of the vinyl ester copolymers, the compressive strength of the solid concrete produced according to the invention is at the same level as the compressive strength of conventional solid concrete. The vinyl ester-ethylene copolymers also result in a better dispersion of the fibers in the fresh concrete, so that "balling" can be prevented and the solid concrete becomes more resilient to stresses. A further, otherwise usual, after-treatment or upgrading of the concrete surface for the production of special thin surface layers resistant to abrasion, such as for example coating with epoxy resin mortars or cement mortars containing special ingredients is not necessary according to the invention. Thus, resilient solid concrete is inexpensively obtained with the concrete compositions according to the invention.

The fresh concrete properties of fiber-containing concrete compositions are, however, also advantageously improved by the vinyl ester-ethylene copolymers according to the invention, for example the workability, the slump or the pumpability. Owing to their ethylene component, the vinyl ester-ethylene copolymers are internally plasticized and surprisingly have a liquefying action on fresh concrete, which manifests itself in the slump of fresh concrete. Thus, compared to corresponding fiber-free fresh concrete, conventional fiber-containing fresh concrete displays lower slump. This disadvantage manifests itself particularly with plastic fibers, such as polypropylene and polyvinyl alcohol fibers, but also with steel fibers. Through the use of the fiber-containing concrete compositions according to the invention, fresh concrete is obtained which has higher slump compared to conventional, fiber-containing fresh concrete. Compared to conventional, fiber-containing fresh concrete, the fiber-containing concrete compositions according to the invention are also more readily pumpable.

The fiber-containing concrete compositions are suitable for all common uses of concrete, in particular for the production of industrial floors, concrete roads, concrete slabs, walls, such as cellar walls, ram piles or finished concrete parts such as concrete pipes, concrete slabs (e.g. for garages), prefabricated walls, for slope stabilization, for tunnel applications (such as for example tunnel lining or tubbing) or mine applications (e.g. rolling shafts).

The following examples serve for the detailed illustration of the invention and should in no way be understood as a restriction.

Production of the Fiber-Containing Concrete Compositions

Components for the production of the fiber-containing concrete compositions:
Portland cement (CEM II A-S 42.5 R)
Gravel 0-8 mm (the grading curve B16 was screened through an 8 mm sieve)
Water-cement value w/c=0.55
  Copolymers:
  Polymer 1:
Polyvinyl alcohol-stabilized aqueous 52.8 wt % dispersion of a vinyl acetate-ethylene copolymer (ethylene content: 21 wt %, based on the total weight of the polymer) with a glass transition temperature of −7° C.
  Polymer 2:
Polyvinyl alcohol-stabilized aqueous 58.4 wt % dispersion of a vinyl acetate-ethylene copolymer (ethylene content: 9 wt %, based on the total weight of the polymer) with a glass transition temperature of +15° C.
  Fibers:
Steel fiber from Baumbach, WLS-30/0.75 H/Zn
Polypropylene fiber from STW, coarse (18 mm)
Polyvinyl alcohol fiber from Kuraray, RFS 400×18 (18 mm)

The composition of each fiber-containing concrete composition is stated in table 1.

For the production of each fiber-containing concrete composition, cement, gravel and if appropriate fibers were premixed to a dry mixture for a few seconds in a positive mixer. Next, water and if appropriate the relevant polymer dispersion were added. Mixing was continued for a further 2 minutes. A resting time of 5 minutes followed, before mixing again for 2 minutes.

With the use of steel fibers, these were introduced during the production of the dry mixture. With the use of polypropylene and polyvinyl alcohol fibers, these were added together with the mixing water.

Production of the Test Pieces

Three test pieces (dimensions: 40 mm high, 40 mm wide and 160 mm long) were produced in accordance with DIN EN 196-1 (2005). For this, the concrete was introduced into steel shuttering and compacted for one minute on a shaker table.

The steel shuttering was covered with film and stored for 24 hours in the climatic chamber (23° C./50% r.h.) until removal of the shuttering. After removal of the shuttering, the test pieces were covered with plastic film up to the age of 7 days and stored in a standard climate (23° C./50% r.h.). Next, the plastic film was removed and the samples were stored up to the age of 28 days in a standard climate (23° C./50% r.h.).

Determination of the Properties of the Fresh and Solid Concrete

The slump of the fresh concrete mixtures was determined as per EN 12350-5 or in accordance with DIN EN 1015-3.

Bending tensile strength (BTS) and compressive strength (CS) were determined as per DIN 1048-5 or in accordance with DIN 12808-3 (three point bending test, loading by single load in the middle of the test piece; compressive strength of the test piece halves broken during the bending).

Fresh and solid concrete properties of the concrete mixtures are stated in table 1.

Testing

The testing of the wear resistance was carried out by the Los Angeles method DIN EN 1097-2 (1998). A hollow drum (internal diameter 245 mm, internal length 300 mm) with two rectangular driver ridges (length 300 mm, width 35 mm) mounted in the internal space was used as the test apparatus. The hollow drum rotated about a horizontal axis (driven by two rubber rollers). The revolution rate of the hollow drum was 29 rpm.

The ball load consisted of ten steel balls with a diameter of 50 mm and a weight of 0.508 kg (total weight 5.08 kg).

The total weight of three compressed air-cleaned test pieces was determined directly before the measurement. The three test pieces were placed in the hollow drum with 10 steel balls. After 500 revolutions, the test pieces were removed, cleaned with compressed air and the total weight of the test pieces determined.

The attrition of the three test pieces was found as the difference between total weight before the measurement and total weight after 500 revolutions.

The results are shown in table 1.

From table 1 it can be seen that according to the invention a higher slump is obtained (items 3 and 6 and 2, 4 and 5 respectively). Likewise, through the use of the vinyl ester-ethylene copolymers the bending tensile strength (BTS) is improved (items 2 and 5 and 3 and 6 respectively).

Particularly good results are obtained with the polymer dispersion 1, wherein the copolymer has a higher ethylene content compared to the polymer dispersion. Surprisingly, the compressive strength of the solid concrete produced according to the invention is at the same level as the compressive strength of conventional solid concrete, in spite of the ethylene component of the vinyl ester copolymers.

TABLE 1

| | Item | | | | | | | | |
|---|---|---|---|---|---|---|---|---|---|
| | 1 | 2 | 3 | 4 | 5 | 6 | 7 | 8 | 9 |
| Weighings based on 1 m$^3$ | | | | | | | | | |
| CEM II-AS 42.5 R [kg] | 370.00 | 370.00 | 370.00 | 370.00 | 370.00 | 370.00 | 370.00 | 370.00 | 370.00 |
| Water [kg] | 203.50 | 203.50 | 203.50 | 186.94 | 170.38 | 170.38 | 170.38 | 190.32 | 177.14 |
| Polymer dispersion 1 [kg] | | | | 35.06 | 70.12 | 70.12 | 70.12 | | |
| Polymer dispersion 2 [kg] | | | | | | | | 31.68 | 63.36 |
| Steel fibers [kg] | | 40.00 | | 40.00 | 40.00 | | | 40.00 | 40.00 |
| Polypropylene fibers [kg] | | | 2.73 | | | 2.73 | | | |
| PVOH fibers [kg] | | | | | | | 3.90 | | |
| B-16 gravel, sieved [kg] | 1704.39 | 1690.87 | 1696.44 | 1641.86 | 1592.84 | 1598.39 | 1598.39 | 1641.86 | 1592.84 |
| Total [kg] | 2277.89 | 2304.37 | 2272.67 | 2273.86 | 2243.34 | 2211.62 | 2212.79 | 2273.86 | 2243.34 |
| Fresh concrete properties | | | | | | | | | |
| Slump [cm] | 13.7 | 13.4 | 11.5 | 14.1 | 16.0 | 13.9 | 15.1 | 12.3 | 11.8 |
| Solid concrete properties | | | | | | | | | |
| BTS (mean value) [N/mm$^2$] | 7.96 | 8.24 | 8.08 | 8.96 | 9.73 | 9.67 | 9.65 | 8.22 | 9.47 |
| CS (mean value) [N/mm$^2$] | 42.19 | 44.06 | 34.11 | 42.20 | 43.54 | 34.44 | 39.88 | 37.80 | 34.28 |
| Attrition test | | | | | | | | | |
| Attrition [kg] | 50.50 | 46.60 | 44.10 | 38.80 | 27.60 | 26.20 | 25.00 | 40.60 | 31.50 |

The invention claimed is:

1. A fiber-containing concrete composition containing hydraulically setting binders, 65 to 90 wt % of fillers from the group consisting of gravel and chippings, 0.01 to 15 wt % of one or more fibers, and 0.1 to 5.0 wt % of one or more vinyl ester-ethylene copolymers, the vinyl ester-ethylene copolymers consisting of the following monomers in polymerized form:
   a) one or more vinyl esters selected from the group consisting of vinyl acetate, vinyl propionate, vinyl butyrate and 1-methylvinyl acetate,
   b) ethylene, and optionally
   c) one or more further ethylenically unsaturated comonomers, wherein the further ethylenically unsaturated comonomers are selected from the group consisting of methacrylate esters or acrylate esters with unbranched or branched alcohols with 1 to 15 C atoms, ethylenically unsaturated silanes, vinyl aromatics, vinyl halides, dienes, olefins different from ethylene, ethylenically unsaturated carboxylic acid nitriles, mono and diesters of fumaric acid and maleic acid and ethylenically unsaturated sulfonic acids or salts thereof,
   wherein the statements in wt % each relate to 100 wt % dry mass of the fiber-containing concrete composition, and wherein the vinyl ester-ethylene copolymers are stabilized by a protective colloid.

2. The fiber-containing concrete composition as claimed in claim 1, wherein the vinyl ester-ethylene copolymers contain 5 to 35 wt % of ethylene, based on the total mass of the vinyl ester-ethylene copolymers.

3. The fiber-containing concrete composition as claimed in claim 1, wherein the vinyl ester-ethylene copolymers have glass transition temperatures Tg from −15 to 20° C.

4. The fiber-containing concrete composition as claimed in claim 1, wherein the vinyl ester-ethylene copolymers are selected from the group consisting of
   1) copolymers of one or more vinyl esters with ethylene,
   2) copolymers of one or more vinyl esters with ethylene and one or more methacrylate esters or acrylate esters, and
   3) copolymers of one or more vinyl esters with ethylene and vinyl chloride.

5. The fiber-containing concrete composition as claimed in claim 1, wherein as fibers natural, modified natural or artificial fibers are used.

6. The fiber-containing concrete composition as claimed in claim 1, wherein the fibers are selected from the group consisting of steel fibers, glass fibers, carbon fibers and fibers of polypropylene, polyethylene, polyvinyl alcohol, polyacrylonitrile, polyester, polyamide and cellulose fibers and modified cellulose fibers.

7. Solid concrete with a layer thicknesses of ≥5 cm produced from the fiber-containing concrete composition as claimed in claim 1.

8. A concrete article produced from the fiber-containing concrete composition as claimed in claim 1, selected from the group consisting of industrial floors, concrete roads, floor slabs, walls, ram piles, finished concrete parts, concrete slabs, prefabricated walls, slope stabilization structures or tunneling or mining structures.

9. Solid concrete according to claim 8, having a layer thickness of ≥15 cm.

10. The fiber-containing concrete composition as claimed in claim 1, wherein the protective colloid comprises partly saponified or fully saponified polyvinyl alcohols with a hydrolysis level of 80 to 100 mol % and a Happier viscosity, in 4% aqueous solution, of 1 to 30 mPas.

11. The fiber-containing concrete composition as claimed in claim 1, wherein the vinyl ester-ethylene copolymers are selected from the group consisting of:
   1) copolymers based on monomers consisting of one or more vinyl esters with ethylene, and
   2) copolymers based on monomers consisting of one or more vinyl esters with ethylene and vinyl chloride.

12. The fiber-containing concrete composition according to claim 1, wherein the protective colloid is selected from the group consisting of polyvinyl alcohols.

13. The fiber-containing concrete composition as claimed in claim 1, wherein the vinyl ester-ethylene copolymers are copolymers selected from the group consisting of
   vinyl acetate with 8 to 25 wt % ethylene; and
   vinyl acetate with 5 to 25 wt % ethylene and 1 to 45 wt % of at least one of a methacrylate ester and acrylate ester.

* * * * *